3,511,874
ESTERS OF BARK PHENOLIC ACIDS
George Graham Allan, Seattle, Wash., assignor to Weyerhaeuser Company, Tacoma, Wash., a corporation of Washington
No Drawing. Continuation-in-part of application Ser. No. 399,881, Sept. 28, 1964. This application Apr. 23, 1968, Ser. No. 723,611
Int. Cl. C07c 69/88
U.S. Cl. 260—473.5     5 Claims

ABSTRACT OF THE DISCLOSURE

The reaction product of aqueous alkali extracted Douglas fir bark phenolic acid and polyalcohols or unsaturated monohydric alcohols in the presence of an acid catalyst.

Cross reference to related applications

This application is a continuation-in-part of application Ser. No. 399,881, filed Sept. 28, 1964, for "Esters of Bark Phenolic Acids," now abandoned.

This invention relates to a composition of matter. More specifically, this invention relates to a composition of matter derived from the combination of bark phenolic acids and polyalcohols or unsaturated monohydric alcohols.

Heretofore, the lumber industry has been plagued with wasteful by-products in the production of lumber and wood products. One of these by-products is the bark from the tree.

In recent years, much time and effort have been expended on finding a use for this wasteful by-product. U.S. Pat. No. 2,890,231, issued to Clark C. Heritage and Lionel E. Dowd describes a process for extracting the chemical products from bark with an alkaline solvent. The resulting products from this process include an alkaline solution of bark phenolic acids. Analysis of these bark phenolic acids shows that they contain up to 15% by weight of carboxyl groups. As sodium salts, these bark phenolic acids are hydrophilic and are water soluble. They currently find usage in outlets such as dispersants for drilling mud compositions, cement additives, pesticide dispersants and the like.

Previous attempts to use these salts of bark phenolic acids in resins have been confined to modification of conventional water-soluble phenol-formaldehye resins of the type used in plywood adhesives. These efforts to replace phenol have not been notably successful technically and are economically unattractive. Other attempts to use this product in the free phenolic acid form have failed because of its only partial water solubility and its failure to dissolve completely in applicable organic solvent systems.

An object of this invention is to provide a new composition of matter derived from the bark phenolic acids.

Another object of this invention is to provide a new composition of matter from bark phenolic acids that is hydrophobic or organic solvent soluble which is useful in resins that are used in coatings, adhesives, and encapsulants.

Another object of this invention is to provide a method of forming a composition of matter from bark phenolic acids.

In this invention, the bark phenolic acids are transformed into organic solvent soluble products by esterification of their carboxylic acid groups using a polyhydric alcohol or unsaturated monohydric alcohol.

Functional groups of various types can be introduced into the bark phenolic acids by esterification using unsaturated esterifiable alcohols. Thus, for example, allyl alcohol having the formula $CH_2=CH-CH_2OH$ can be used to introduce double bonds. Also, hydroxyl groups may be introduced into the bark phenolic acids by esterification using esterifiable polyols, as, for example, those containing 2 to 3 hydroxyl groups and from 2 to 80 carbon atoms. Exemplary of polyols which may be used are ethyleneglycol, 1,3-butyleneglycol, 1,2,6-hexanetriol, polyethyleneoxydiols having average molecular weights ranging from 200 to 500, polypropyleneoxydiol having average molecular weights ranging from 400 to 1200 and polybutyleneoxydiol having an average molecular weight of 500, diethyleneglycol, triethyleneglycol, propyleneglycol, and polyepichlorohydringlycol. The esters formed using the polyols find a wide utility in coatings, curing agents for epoxy resins and as modifiers for various resins.

The reaction between the bark phenolic acids and the alcohols is carried out in the presence of a catalyst. The catalyst in this instance is an acid catalyst selected from the group of which sulfuric acid, hydrochloric acid, phosphoric acid or mixtures thereof would be typical. The reaction may be carried out either at ambient or elevated temperatures, though at lower temperatures, internal condensations are minimized and higher saponification values are attained. Accordingly, the product may be formed by adding the sulfuric acid catalyst, bark phenolic acids or salt thereof and the esterication alcohol and stirring for up to about 70 hrs., depending on the alcohol used. Appropriate solvents such as acetone or methylethylketone can be used as reaction diluents if necessary to reduce viscosity or promote reaction. The mixture can be diluted with water and centrifuged to remove excess acid catalyst in the aqueous phase. The product is obtained in 80% overall yield by evaporation of the solution, preferably under reduced pressure and the excess alcohol may be recovered and recycled. The product is a black powder and is readily soluble in organic solvents such as methylethylketone or isobutanol.

In order to further illustrate this invention, the following examples are provided:

EXAMPLE I

Several laboratory experiments were performed to indicate the reaction of allyl alcohol with bark phenolic acids. In each instance, a suspension of 20 grams of the sodium salt of the bark phenolic acids in 300 milliliters of allyl alcohol was treated with 10 milliliters of concentrated sulfuric acid added dropwise at room temperature. The reaction mixture was diluted with methylethylketone and treated with sodium bicarbonate until the pH was between 2 and 3 and then the mixture was filtered. The following table indicates the results of the above procedure:

TABLE I

| Alcohol Used | Reaction time, hrs. | Product yield, g. |
|---|---|---|
| Allyl | 6 | 19.4 |
| Do | 18 | 18.6 |
| Do | 71 | 19.4 |
| Do | 15.5 | 11.8 |
| Do | 72 | 11.4 |

EXAMPLE II

Several laboratory experiments were performed to indicate the reaction of several different polyols with the bark phenolic acids. In each instance, a suspension of the sodium salt of the bark phenolic acids in esterifying polyol was treated with sulfuric acid. The reaction mixture produced a product which is indicated in Table II with the product being expressed in grams per 100 grams of sodium salt of the bark phenolic acids including an excess of polyol.

TABLE II

| Alcohol used | Volume, ml. | Weight of starting material, g. | Product yield, g. |
|---|---|---|---|
| Ethyleneglycol | 300 | 20 | 118 |
| Polyethyleneoxydiol, mol. wt. 400 | 200 | 11.5 | 260 |
| Polyethyleneoxydiol, mol. wt. 600 | 555 | 228 | 335 |
| Polyethyleneoxydiol, mol. wt. 400 | 525 | 228 | 298 |
| Polypropyleneoxydiol, mol. wt. 400 | 35 | 20 | 238 |
| Polypropyleneoxydiol, mol. wt. 400 | 15 | 20 | 150 |
| Polypropyleneoxydiol, mol. wt. 400 | 150 | 200 | 135 |
| Polypropyleneoxydiol, mol. wt. 1,200 | 150 | 200 | 150 |

While various specific examples of a preferred procedure embodying the above invention have been described above, it will be apparent that many changes and modifications may be made without departing from the spirit of the invention. Therefore, it should be understood that the examples cited are intended to be illustrative only and are not intended to limit the scope of the invention.

What is claimed is:

1. The reaction product of alkali extracted bark phenolic acid and an esterifiable aliphatic hydrocarbon polyalcohol or aliphatic hydrocarbon polyether polyalcohol in the presence of an acid catalyst.

2. The product of claim 1 wherein said polyalcohol is one having two to three hydroxyl groups and from 2 to 80 carbon atoms.

3. The product of claim 1 wherein said polyalcohol is selected from the group consisting of 1,3-butylene glycol, 1,2,6-hexanetriol, polyethyleneoxydiols having an average molecular weight ranging from 200 to 500, polypropleneoxydiol having an average molecular weight ranging from 400 to 1200, polybutyleneoxydiol having an average molecular weight of 500, diethyleneglycol, triethyleneglycol, propyleneglycol, polyepichlorohydringlycol and mixtures thereof.

4. The reaction product as set forth in claim 1 wherein the bark phenolic acid contains up to 15% by weight of carboxyl groups.

5. The reaction product of aqueous alkali extracted bark phenolic acid and allyl alcohol in the presence of an acid catalyst.

References Cited

UNITED STATES PATENTS 2,845,450   7/1958   Anderson et al. ____ 260—473.5

LORRAINE A. WEINBERGER, Primary Examiner

D. E. STENZEL, Assistant Examiner

U.S. Cl. X.R.

260—46, 473.6